(12) United States Patent
Sherwin et al.

(10) Patent No.: US 8,667,531 B2
(45) Date of Patent: *Mar. 4, 2014

(54) METHOD FOR ADVERTISING DECISION RESOLUTION ACCELERATION BASED ON LOOKAHEAD OPPORTUNITY TRIGGERING

(71) Applicant: This Technology, Inc., New York, NY (US)

(72) Inventors: Jeffrey Sherwin, Scarsdale, NY (US); John Raymond Mick, Jr., Sunnyvale, CA (US)

(73) Assignee: This Technology, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,993

(22) Filed: Mar. 6, 2013

(65) Prior Publication Data

US 2013/0268965 A1 Oct. 10, 2013

Related U.S. Application Data

(63) Continuation of application No. 13/442,351, filed on Apr. 9, 2012, now Pat. No. 8,533,755.

(51) Int. Cl.
*H04N 7/10* (2006.01)
(52) U.S. Cl.
USPC ........ 725/35; 725/144; 705/14.43; 705/14.52

(58) Field of Classification Search
USPC ........... 725/32, 34, 35, 144; 705/14.43, 14.52
See application file for complete search history.

(56) References Cited

U.S. PATENT DOCUMENTS

| | | | |
|---|---|---|---|
| 8,443,385 B1* | 5/2013 | Schlack | 725/35 |
| 2003/0070167 A1* | 4/2003 | Holtz et al. | 725/32 |
| 2007/0022032 A1* | 1/2007 | Anderson et al. | 705/35 |
| 2007/0055983 A1* | 3/2007 | Schiller et al. | 725/32 |
| 2009/0031339 A1* | 1/2009 | Pickens et al. | 725/32 |
| 2009/0150930 A1* | 6/2009 | Sherwin et al. | 725/35 |
| 2011/0295686 A1* | 12/2011 | Martin-Cocher | 705/14.49 |

* cited by examiner

*Primary Examiner* — Brian T Pendleton
*Assistant Examiner* — Alan Luong
(74) *Attorney, Agent, or Firm* — Lowenstein Sandler LLP

(57) ABSTRACT

A server receives a source signal stream having a channel identifier and an indication that an advertisement placement opportunity is located in the signal stream a time period prior to an advertisement signal point. The server transmits the channel identifier to a session manager. The server receives from the session manager a list of sessions corresponding to a number of recipients currently viewing a channel corresponding to the channel identifier. The server transmits to an ad decision service an ad call for each session in the list. The server receives from the ad decision service a plurality of advertisements targeted to the list. The server stores the plurality of advertisements in at least one cache prior to expiration of the time period, where the advertisement signal point is detected by the programmed computer.

14 Claims, 5 Drawing Sheets

METHOD FOR ADVERTISING DECISION RESOLUTION ACCELERATION BASED ON LOOKAHEAD OPPORTUNITY TRIGGERING

CROSS-REFERENCE TO RELATED APPLICATIONS

This application claims the benefit of and is a continuation of U.S. patent application Ser. No. 13/442,351 filed Apr. 9, 2012, the disclosure of which is incorporated herein by reference in its entirety.

FIELD OF THE INVENTION

The present invention relates generally to service provider video networks, and more particularly to a method and system for accelerating advertising placement decisions in signal streams.

BACKGROUND OF THE INVENTION

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a linear model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 9, represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

In non-linear systems, such as Video-on-Demand (VOD), the intervals 6, 8, 9 may take on new meanings. The interval 6 is called a pre-roll, i.e., the space in a video that occurs immediately after a user clicks to start a VOD video. The interval 9 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. All of the intervals 6, 8, 9 in such play lists are ripe for the insertion of advertisements, i.e., advertisement placement opportunities.

On TV, the advertising network was formerly the national network, the cable network, or the cable operator. However, unlike the Internet, where browsers access/display content and then are separately "referred" to a shared ad network, the cable television infrastructure selects and assembles both the advertisement and the content together in the network and delivers the combined result to customers' "smart appliances" (e.g., Internet ready televisions, radios, smartphones, tablets, PCs, etc.).

Recently, smart appliances, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance from a content delivery network (CDN) directly to the application running in the smart appliance without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance fetching video in predetermined time chunks—generally two sometimes three, sometimes ten second chunks. The fetched chunks of video are seamlessly stitched together dynamically in the app software and then displayed so as to appear as a smooth video on the smart appliance.

A Multiple System/Service Operator (MSO—a cable TV organization that owns more than one cable system and may prove broadband Internet service) may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content deliver networks (CDN) where a "set top box" for each channel is configured to receive broadcasts from satellites. A signal received by a "set top box" is fed to a transcoder to place the signal in a desired format and to fragment the formatted signal into the predetermined (e.g., 2 second) chunks of data. These chunks are then stored at a CDN on server farms located physically close to where the content is to be delivered.

To identify a particular channel data stream, including times when a program has ended and before the next program begins, i.e., a placement opportunity, a q-tone is inserted in the digital stream a predetermined time before the next program begins. An observer, which may be a transcoder, informs an ad server (ADS) of the arrival of the q-tone for subsequent placement of one or more ads into the channel data stream. The ad server, in turn, is waiting for the subsequent arrival of requests from CDNs to place ads into breaks in the data stream.

Unfortunately, requests may lead to congestion, dropped requests, and re-boots if the ad server is flooded with requests. This is particularly true of national-based television programming, where tens of thousands to millions of requests for ads may flood a single or a few ad servers substantially simultaneously.

Accordingly, what would be desirable, but has not yet been provided, is a method and system for accelerating advertising placement decisions in signal streams.

SUMMARY OF THE INVENTION

The above-described problems are addressed and a technical solution is achieved in the art by providing a computer implemented method and system for accelerating advertising placement decisions from the point of view of a server. A server receives a source signal stream having a channel identifier and an indication that an advertisement placement opportunity is located in the signal stream a time period prior to an advertisement signal point. The server transmits the channel identifier to a session manager. The server receives from the session manager a list of sessions corresponding to a number of recipients currently viewing a channel corresponding to the channel identifier. The server transmits to an ad decision service an ad call for each session in the list. The server receives from the ad decision service a plurality of advertisements targeted to the list. The server stores the plurality of advertisements in at least one cache prior to expiration of the time period, where the advertisement signal point is detected by the programmed computer.

In an embodiment, the server may divide the time period into a plurality of sub-time periods and divide the session into a plurality of sub-sessions. Storing the plurality of advertisements in at least one cache may further comprise storing the plurality of sub-sessions in the at least one cache distributed over the plurality of sub-time periods.

In an embodiment, the server may confirm the advertisement placement opportunity by binding the source signal stream to the advertisement placement opportunity. Binding the source signal stream to the advertisement placement opportunity may comprise extracting metadata including the channel identifier from the source signal stream, obtaining a temporal starting location of the advertisement placement opportunity in the source stream based on a wall clock time stamp, inserting into the source stream a unique signal ID corresponding to the temporal starting location of the advertisement placement opportunity and the channel identifier; designating the advertisement placement opportunity as a confirmed placement opportunity, and generating a look-ahead decision trigger with the signal ID as trigger data.

In an embodiment, in response to generating a look-ahead decision trigger, the server may perform an ad decision for the confirmed placement opportunity. Performing an ad decision for the confirmed placement opportunity may comprise transmitting the look-ahead decision trigger to an SCTE 130 ad management service and receiving a plurality ad placement decisions.

In an embodiment, the server may transmit the list of sessions and the channel identifier to a subscriber information service and receive, from the subscriber information service a list of sets of audience qualifiers correlated to the sessions and the channel identifier. Obtaining a plurality of advertisements targeted to the list may comprise associating the unique signal ID with each of the plurality of targeted advertisements and storing the plurality of targeted advertisements in the cache. Storing the plurality of targeted advertisements in the cache may comprise transmitting the plurality of targeted advertisements to at least one non-transitory computer-readable storage medium associated with a content delivery network.

The above-described problems are addressed and a technical solution is achieved in the art by providing a computer implemented method and system for accelerating advertising placement decisions from the point of view of a client. The client receives a plurality of requests for advertisements to be inserted in corresponding advertisement signal points of a plurality of recipient signal streams having the same channel identifier. The client retrieves a plurality of advertisements from at least one cache in response to the plurality of requests for advertisements. The client inserts at least one advertisement of the plurality of advertisements in the corresponding advertisement signal points of the plurality of recipient signal streams.

In an embodiment, retrieving the plurality of advertisements from at least one cache in response to the plurality of requests for advertisements may include receiving at least one request from at least one content delivery network for the plurality of advertisements. The at least one advertisement of the plurality of advertisements in the corresponding advertisement signal points of the plurality of recipient signal streams may occur immediately subsequent to an identification of a corresponding signal point in a source signal stream.

BRIEF DESCRIPTION OF THE DRAWINGS

The present invention will be more readily understood from the detailed description of exemplary embodiments presented below considered in conjunction with the attached drawings, of which.

Figure 1:
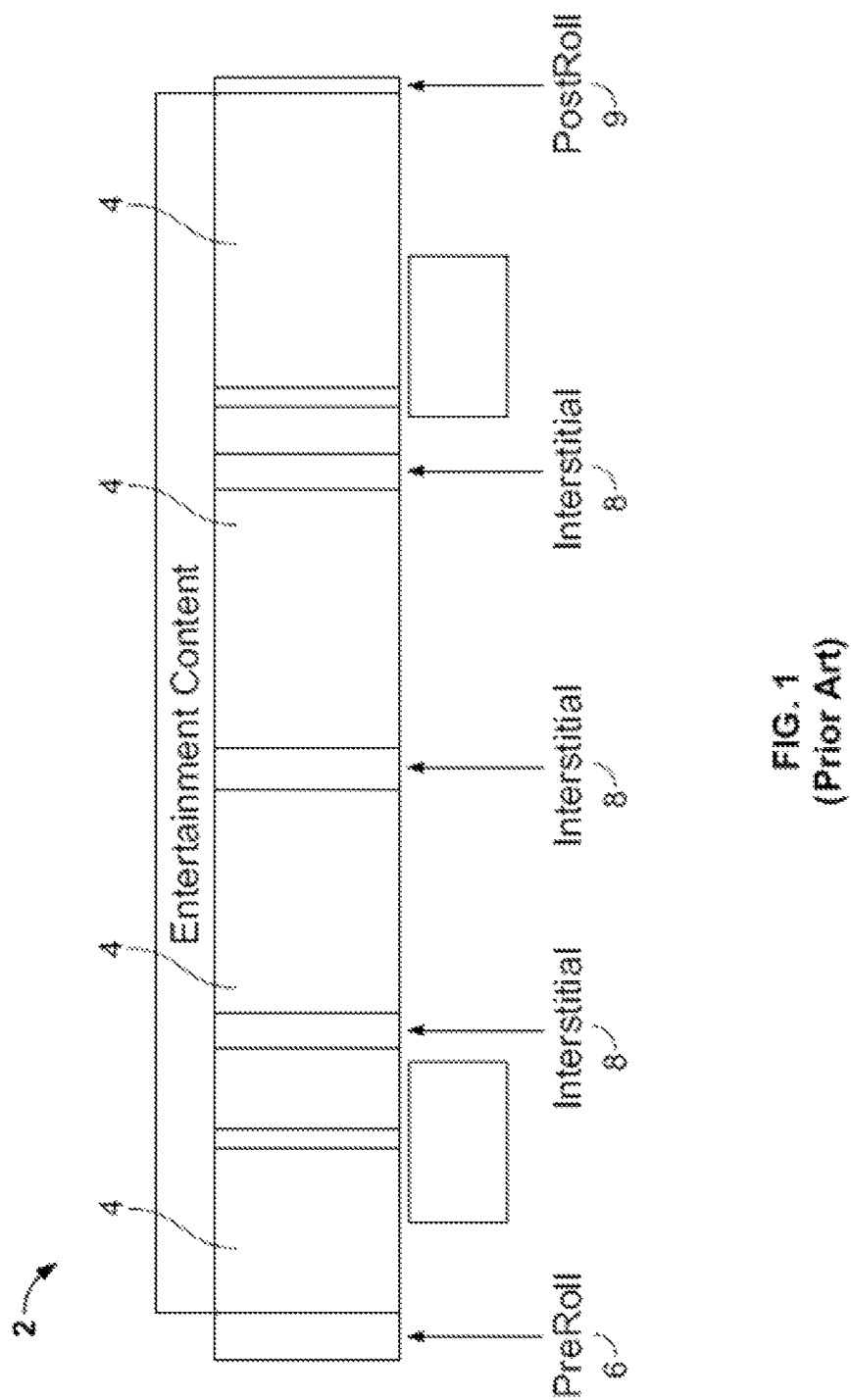
FIG. 1 is a diagram depicting a conventional format of a linear cable video data stream.

It is to be understood that the attached drawings are for purposes of illustrating the concepts of the invention and may not be to scale.

DETAILED DESCRIPTION OF THE INVENTION

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 5), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Certain embodiments of the present invention are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as ad rotation groups (rotation groups refer to placement opportunities that run in rotation so that the same add is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Ad Management Service (ADM) defines messages in support of ad insertion activities. The primary consumer of these messages is an Ad Decision Service (ADS). The message interfaces exposed by an ADM permit both pre-configured ad decisions as well as real-time fulfillment models. An ADM implementation may incorporate some simple ad selection rules (e.g., ad rotations) but more complex ad decisions are the responsibility of an ADS.

An Ad Decision Service (ADS) determines how advertising content is combined with non-advertising (i.e., entertainment) content assets. The decisions made by an ADS may be straightforward (i.e., specific ad content placed at a specific time in a specific asset) or arbitrarily complex (based on subscriber data, advertising zone, etc.).

The Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Ad Decision Service (ADS) to retrieve and utilize content metadata in their advanced advertising decision processing.

The Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Ad Decision Service (ADS) can retrieve and utilize placement opportunity metadata in their advanced advertising decision making.

The Subscriber Information Service (SIS) manages per-subscriber information relevant to ad placement decisions. The SIS provides a mapping between subscriber or client identifiers, such as a MAC address, serial number, etc., and subscriber or audience attributes, e.g., age, sex, location of a subscriber.

Figure 2:
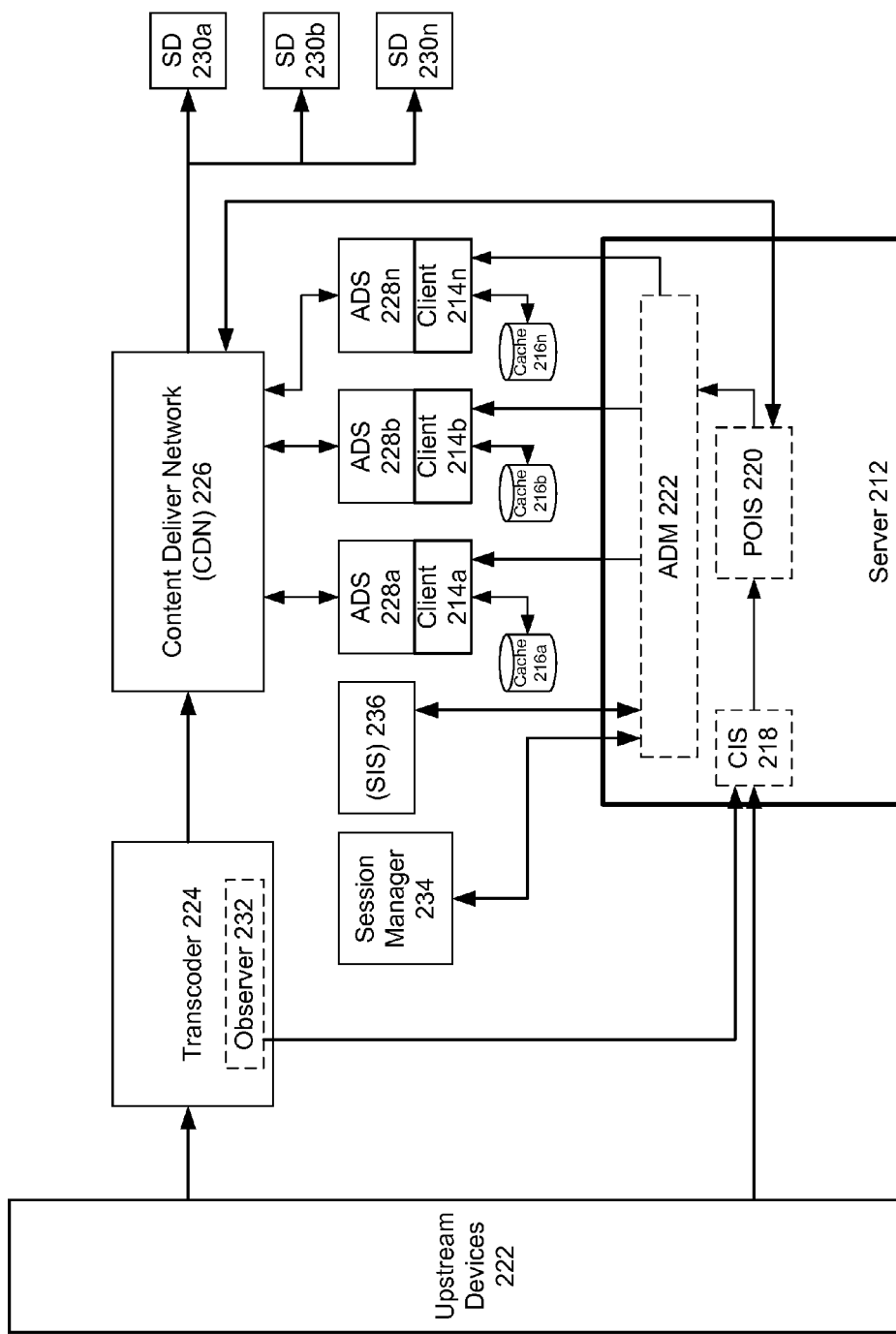
FIG. 2 depicts a configuration of a system for accelerating advertising placement decisions in signal streams, according to an embodiment of the present invention.

FIG. 2 depicts a configuration of a system 200 for accelerating advertising placement decisions in signal streams, according to an embodiment of the present invention. The system 200 may be executed on a server 212, interconnected by one or more networks (not shown) communicatively connected to client devices 214a-214n. The client devices 214a-214n are configured to store and retrieve a predetermined number of advertisements to/from corresponding caches 216a-216n for delivery to corresponding ADSs 228a-228n under the control of the server 212 and the CDN 226.

The server 212 is configured to implement a CIS 218 for receiving one or more source signal streams (e.g., digital video, audio, etc.) from upstream devices 222 and corresponding q-tones (i.e., instances of SCTE-35 packets) from one or more observers 232, which may be incorporated within a transcoder 224. The transcoder 224 is also configured to deliver IP video, audio, etc. in predetermined "chunks" to a CDN 226 as described above.

The CIS 218 is also configured to extract metadata from the one or more source signal streams and from these pre-allocate a corresponding number of unconfirmed placement opportunities without signals and to bind the source signal stream to a plurality of premade, but unconfirmed placement opportunities. Part of the extracted metadata includes a channel identifier associated with a corresponding source signal stream.

A POIS 220 is configured to "confirm" unconfirmed placement opportunities by identifying temporal starting locations of the unconfirmed placement opportunities relative to both the content stream and a wall clock. The POIS is configured to return a globally unique value, a UUID, referred to as a signal identifier or signal ID that uniquely identifies a PO as a confirmed PO and its starting location within the end-to-end operational system. The POIS 220 then inserts the signal ID and the channel identifier into other extracted metadata of the source signal stream using the appropriate in-band carriage format.

In parallel, the POIS 220 is configured to initiate a workflow where by the confirmed signal generates the set of confirmed placement opportunities and fires a lookahead decision trigger with the signal ID as the trigger data. The lookahead decision trigger recipient is an instance of an SCTE 130 Ad Management Service 222, or ADM 222 associated with the server 212. The ADM 222 is configured to identify a list representative of a number of recipient signal streams having the channel identifier and at least one audience attribute prior to expiration of the time period. To identify the list, the ADM 222 places a call each to an external session manager 234 and an SIS 236. The ADM 222 transmits the channel identifier to the session manager 234, which provides the ADM 222 with a list of client identities indicative of a number of recipients currently viewing a channel corresponding to the channel identifier. The ADM 222 transmits the list of client identities and the channel identifier to the SIS 236 which provides the ADM 222 with a list of sets of audience qualifiers correlated to the client identities and the channel identifier. This list of sets of audience qualifiers correlated to the client identities and the channel identifier is representative of a list of recipient signal streams having the same channel identifier that are currently being "watched" by subscribers, where each subscriber in the list has a certain set of audience attributes (e.g., all males 21 and over). The ADM 222 is also configured to obtain a plurality of targeted advertisements corresponding to the list sets of audience qualifiers correlated to the client identities and the channel identifier from one or more ADSs 228a-228n. The ADM 222 receives, from the ADSs 228a-228n, the plurality of advertisements targeted to the list representative of the plurality of recipient signal streams.

The ADM uses the signal ID plus a set of locally configured or learned targeting criteria to initiate a unique set of ad decision requests. The ad decision requests evolve into targeted ad decision requests to the appropriate decision owners and the results are a set of ad placement decisions correlating to the placement opportunities generated as a result of signal confirmation.

The ADM 222 is also configured to stores the obtained list of targeted advertisements in one or more caches 228a-228n under the control of corresponding clients 214a-214n associated with corresponding in the one or more ADSs 228a-228n. The ADM 222 associates the unique signal ID with each of the targeted advertisements and stores the targeted advertisements in the one or more caches 228a-228n. Since there may be thousands to millions of ads to be stored in the one or more caches 228a-228n, in an embodiment, the ADM 222 is configured to divide a time interval between reception of a q-tone and the arrival of a corresponding advertisement signal point into a predetermined number of sub-time intervals and divide the signal stream into a predetermined number of sub-signal streams.

The clients 214a-214n are configured to retrieve predetermined numbers of ads over each of the predetermined number of sub-time intervals for delivery by the ADSs 228a-228n to the predetermined number of sub-signal streams. The CDN 226, in turn, inserts the predetermined number of ads into corresponding placement opportunities of sub-signal streams for ultimate delivery to smart devices (SD) 230a-230n over the predetermined number of sub-time intervals. In this way, the tens of thousands to millions of requests for ads do not flood the ADSs 228a-228n substantially simultaneously.

Figure 3:
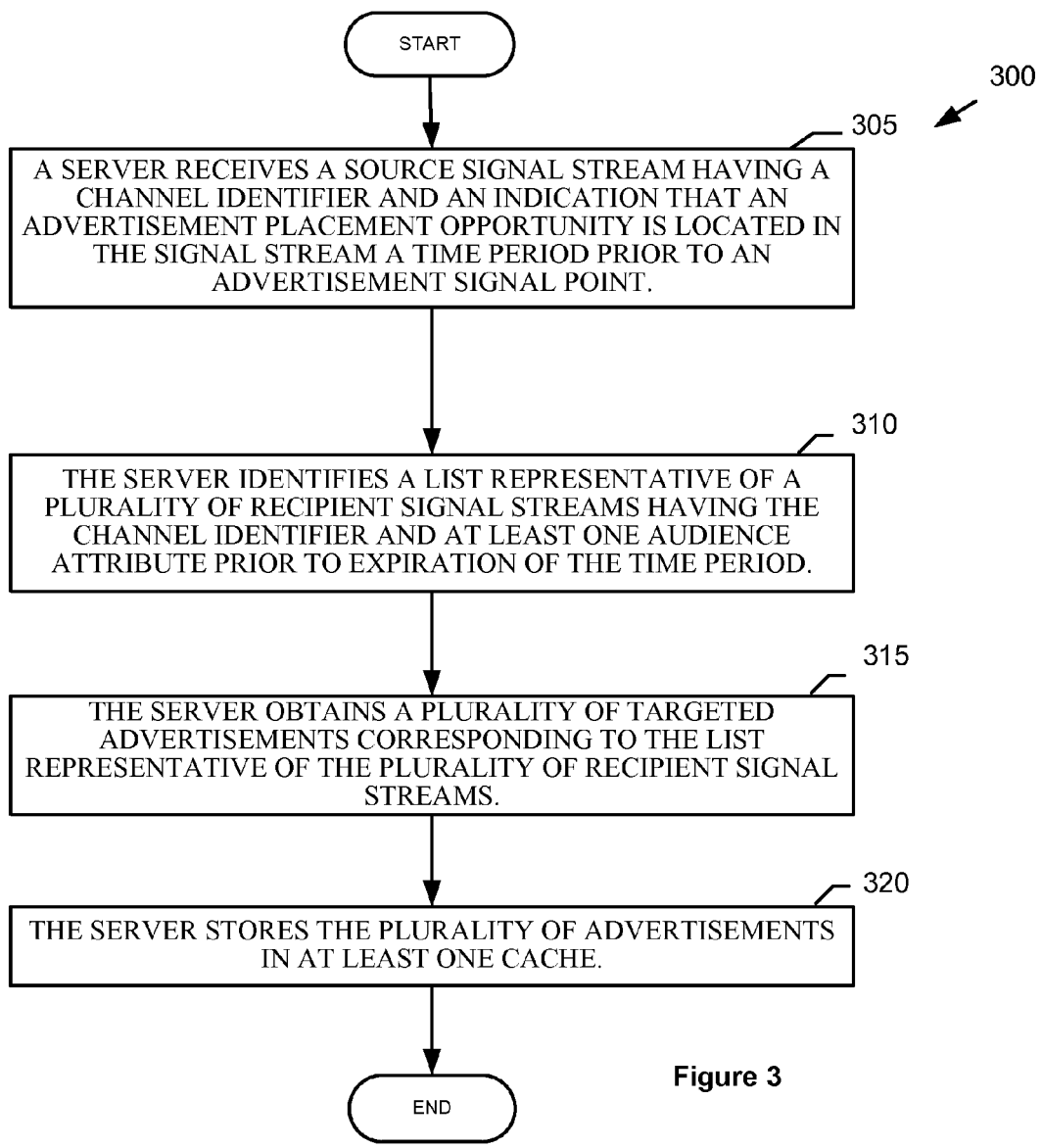
FIG. 3 is a flow diagram illustrating one embodiment of a method for accelerating advertising placement decisions in signal streams from the point of view of a server, according to an embodiment of the present invention.

FIG. 3 is a flow diagram illustrating one embodiment of a method 300 for accelerating advertising placement decisions in data streams from a point of view of a server 212, according to an embodiment of the present invention. At block 305, the CIS 218 associated with the server 212 receives a source signal stream (e.g., in MPEG-2 format) having a channel identifier from the upstream devices 222.

A transcoder 224 associated with a specific vendor format for the source signal stream (e.g., TBS) receives the signal stream and converts the signal stream to IP video. In the process, an observer 232, which may be include in transcoder 224, notes the presence of an SCTE-35 q-tone. In one embodiment, the indication that an advertisement placement opportunity is located in the signal stream is an instance of an SCTE-35 packet indicative of a q-tone. The q-tone also provides an indication that an advertisement placement opportunity is located in the signal stream a time period prior to an advertisement signal point in the signal stream. The observer 232 of the transcoder 224 then places a web call to the CIS 218 to inform the CIS 218 that the q-tone for a specific channel ID has been observed.

The arrival of the SCTE-35 packet is an indication of a number of theoretical placement opportunities (POs) for the specified channel ID (e.g., TBS). Each unconfirmed PO has an estimated starting location known as a signal point. The signal point needs to be confirmed. When an actual ad insertion starting location is encountered in real-time, a software process in the POIS 220 confirms the actual time of the signal point. This confirmed signal point results in the generation of confirmed POs that are now ready for ad insertion.

When the CIS 218 receives the theoretical placement opportunities, the CIS 218 is configured to pre-allocate a corresponding number of unconfirmed placement opportunities without signals and to bind the source signal stream to a plurality of premade, but unconfirmed placement opportunities. Binding the source signal stream to a plurality of premade, but unconfirmed placement opportunities includes the CIS 218 extracting metadata including the channel identifier from the source signal stream. As used herein, the term "binding" refers to an identification of signals and content within a PO. PO's are frequently created for broad amounts of content that are not yet published (i.e., any show on TNT network in the evening).

When a show "airs" and a source signal stream is detected, the source signal stream is bound to the relevant PO's for that show.

When confirmed POs are generated, the same signal point identifier that generated the POs is forwarded and captured by a listening ad decision resolution process in the ADM 222 associated with the server 212. This signal point forwarding is called the lookahead placement decision trigger (or decision trigger for short) that initiates a sequence of software processes. As content is acquired by the CDN 226, the CDN 226 notifies the POIS 220, and the POIS 220 "confirms" the temporal starting location of a placement opportunity relative to both the source signal stream and a wall clock. The POIS 220 returns a globally unique value, a UUID, referred to as a signal identifier or signal ID that uniquely identifies a PO as a confirmed PO and its starting location within the end-to-end operational system. The POIS 220 then inserts the signal ID and the channel identifier into other extracted metadata of the source signal stream using the appropriate in-band carriage format.

In parallel, the POIS 220 initiates a workflow whereby the POIS generates a set of confirmed placement opportunities in the source signal stream and fires a lookahead decision trigger with the signal ID as the trigger data. The lookahead decision trigger recipient is an instance of an SCTE 130 Ad Management Service, or the ADM 222 associated with the server 212.

At block 310, the ADM 222 of the server 212 identifies a list representative of a number of recipient signal streams having the channel identifier and at least one audience attribute prior to expiration of the time period. The list representative of a plurality of recipient signal streams having the channel identifier and at least one audience attribute corresponds to the number of confirmed placement opportunities. To identify the list, the ADM 222 places a call to the external session server 234 and to the external SIS 236. The ADM 222 transmits the channel identifier to the session manager 234, which provides the ADM 222 with a list of client identities indicative of a number of recipients currently viewing a channel corresponding to the channel identifier. The ADM 222 transmits the list of client identities and the channel identifier to the SIS 236 which provides the ADM 222 with a list of sets of audience qualifiers correlated to the client identities and the channel identifier. This list of sets of audience qualifiers correlated to the client identities and the channel identifier is representative of a list of recipient signal streams having the same channel identifier that are currently being "watched" by subscribers on the smart devices 230a-230n, where each subscriber in the list has a certain set of audience attributes (e.g., all males 21 and over).

At block 315, the ADM 222 of the server 212 obtains from one or more ADSs 228a-228n a plurality of targeted advertisements corresponding to the list sets of audience qualifiers correlated to the client identities and the channel identifier. The ADM 222 receives from the ADSs 228a-228n, the plurality of advertisements targeted to the list representative of the plurality of recipient signal streams.

At block 420, the ADM 222 of the server 212 stores the obtained targeted list of advertisements in at least one cache 216a-216n in the one or more ADSs 228a-228n. While storing the targeted list of advertisements in the in at least one cache 216a-216n, ADM 222 associates unique signal IDs with each of the targeted list of advertisements. Storing the obtained targeted list of advertisement in the at least one cache 216a-216n may include transmitting the targeted list of advertisements to at least one JAR (i.e., a Java archive) associated with the one or more clients 214a-214n. Since there may be thousands to millions of ads to be stored in the caches 216a-216n, in an embodiment, the ADM 222 divides the time interval from the reception of a q-tone to an expected arrival of the corresponding signal point in the source signal stream into a predetermined number of sub-time intervals and divides the number (i.e., the count) of received signal streams into a predetermined number of sub-signal streams. The predetermined number of sub-signal streams is distributed over the predetermined number of sub-time intervals to the caches 216a-216n associated with the clients 214a-214n.

Figure 4:
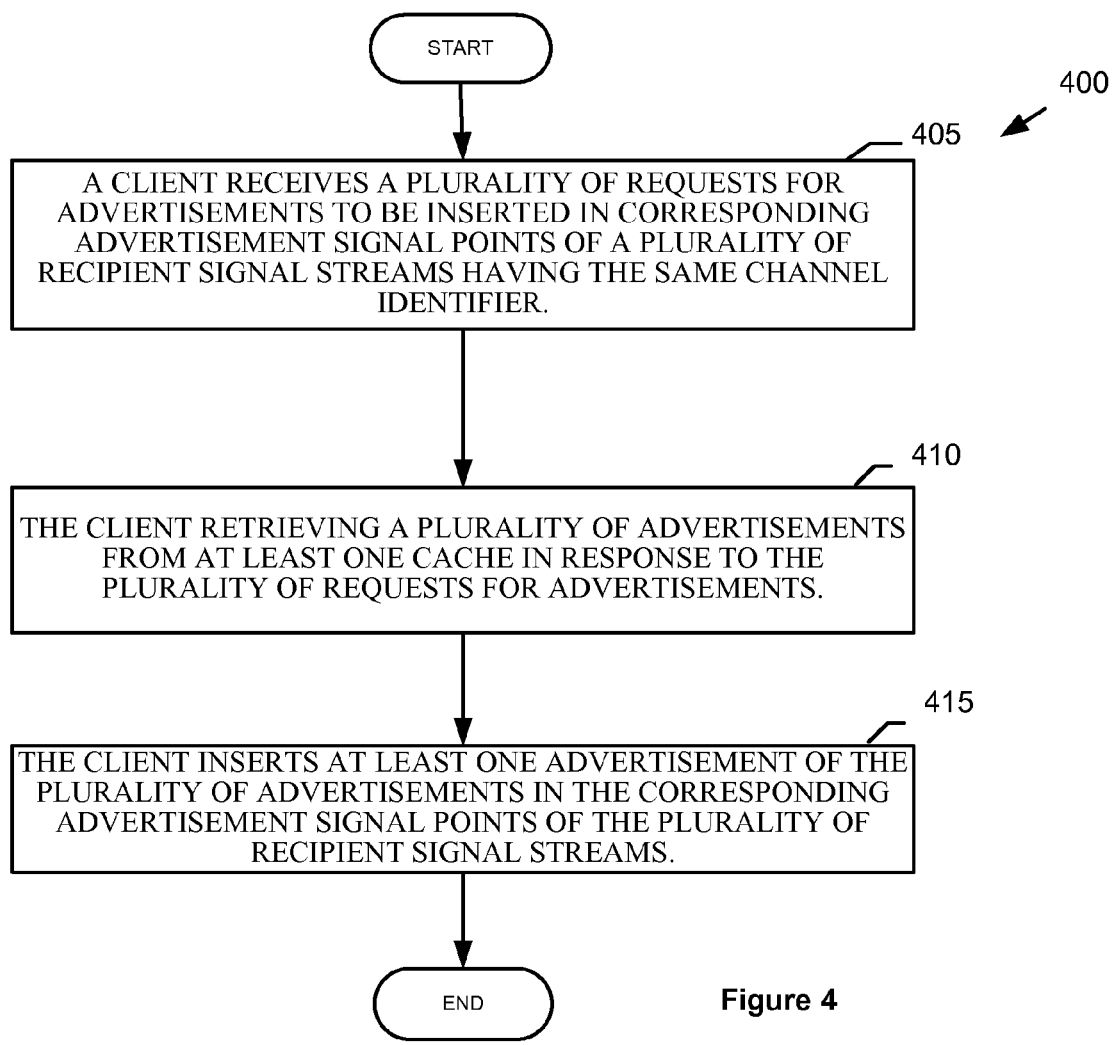
FIG. 4 is a flow diagram illustrating one embodiment of a method for accelerating advertising placement decisions in signal streams from the point of view of a client, according to an embodiment of the present invention.

FIG. 4 is a flow diagram illustrating one embodiment of a method 400 for accelerating advertising placement decisions in data streams from a point of view of one of the clients 214a-214n, according to an embodiment of the present invention. At block 405, a client (e.g., 214a), which is configured to control a cache (e.g., 216a), receives a predetermined number of requests from the CDN 226 for advertisements to be inserted in corresponding signal points of a number of recipient signal streams having the same channel identifier. At block 410, the client retrieves the predetermined number of advertisements from the cache (e.g., 216a). At block 415, the client 214a inserts the predetermined number of advertisements in the corresponding advertisement signal points of the predetermined number of recipient signal streams. The predetermined number of advertisements inserted in the corresponding advertisement signal points of a predetermined number of recipient signal streams occurs immediately subsequent to an identification of a corresponding signal point in a source signal stream by the ADM 222.

Figure 5:
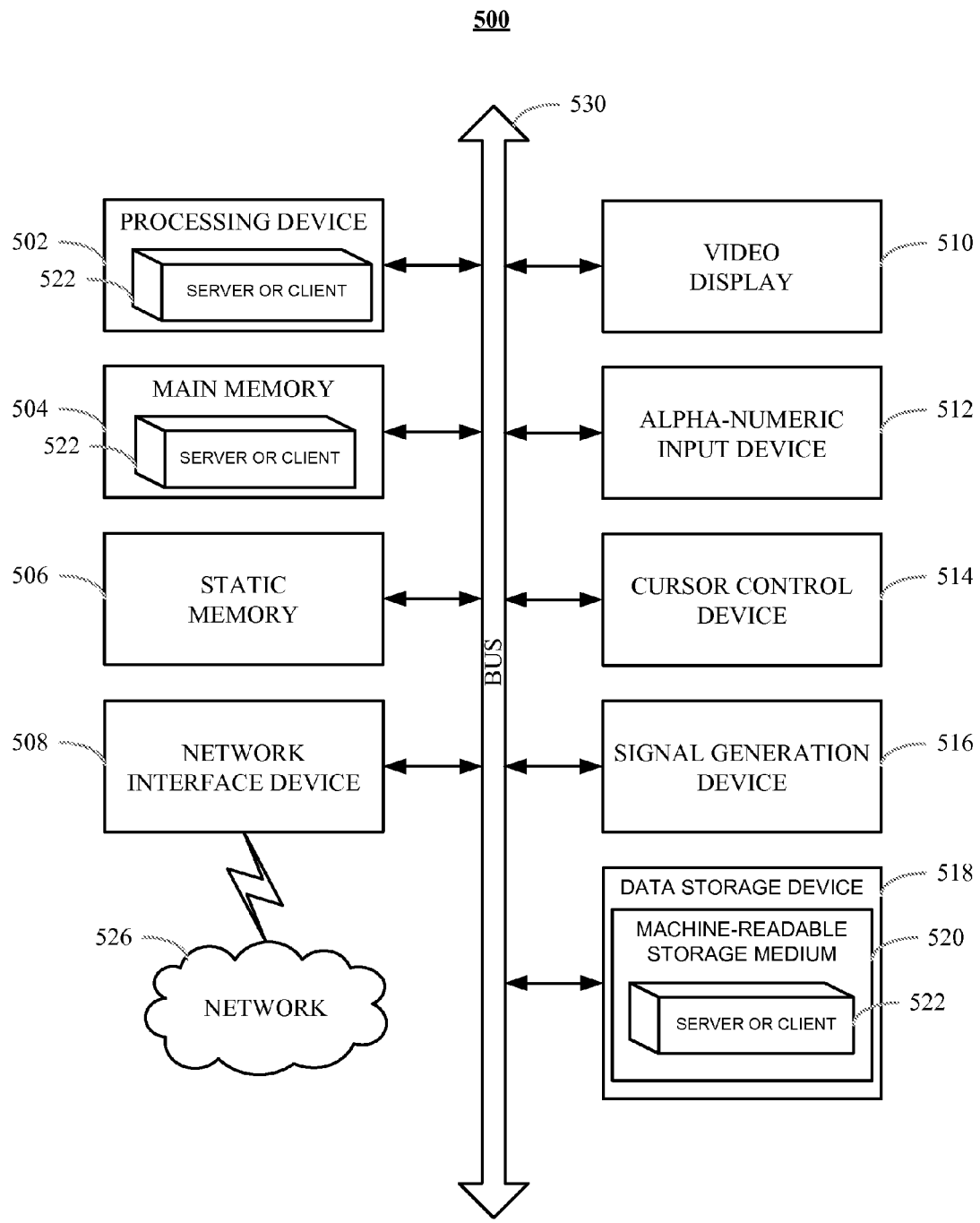
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the server 212 or the clients 214a-214n, communicatively connected for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions 522 (e.g., the server 212 or the clients 214a-214n) embodying any one or more of the methodologies of functions described herein. The server 212 or the clients 214a-214n may also reside, completely or at least partially, within main memory 504 and/or within processing device 602 during execution thereof by computer system 500; main memory 504 and processing device 502 also constituting machine-readable storage media. The server 212 or the clients 214a-214n may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for accelerating advertising placement decisions, comprising:

receiving, at a programmed computer, a source signal stream having a channel identifier and an indication that an advertisement placement opportunity is located in the signal stream a time period prior to an advertisement signal point;

transmitting, using the programmed computer, the channel identifier to a session manager;

receiving, from the session manager at the programmed computer, a list of sessions corresponding to a number of recipients currently viewing a channel corresponding to the channel identifier;

transmitting, using the programmed computer, the list of sessions and the channel identifier to a subscriber information service;

receiving, by the programmed computer from the subscriber information service, a list of sets of audience qualifiers correlated to the list of sessions and the channel identifier;

transmitting, to an ad decision service using the programmed computer, an ad call for each session in the list of sessions;

receiving, from the ad decision service at the programmed computer, a plurality of advertisements targeted to the list of sessions; and storing, using the programmed computer, the plurality of advertisements in at least one cache prior to expiration of the time period, wherein the advertisement signal point is detected by the programmed computer.

2. The method of claim 1, further comprising:

dividing the time period into a plurality of sub-time periods and dividing the session into a plurality of sub-sessions.

3. The method of claim 2, wherein the step of storing the plurality of advertisements in at least one cache further comprises storing the plurality of sub-sessions in the at least one cache distributed over the plurality of sub-time periods.

4. The method of claim 1, wherein the indication that an advertisement placement opportunity is located in the signal stream is an instance of a Society of Cable and Telecommunications Engineers (SCTE) 35 packet indicative of a cue tone.

5. A computer-implemented method for accelerating advertising placement decisions, comprising:

receiving, at a programmed computer, a source signal stream having a channel identifier and an indication that an advertisement placement opportunity is located in the signal stream a time period prior to an advertisement signal point;

transmitting, using the programmed computer, the channel identifier to a session manager;

receiving, from the session manager at the programmed computer, a list of sessions corresponding to a number of recipients currently viewing a channel corresponding to the channel identifier;

transmitting, to an ad decision service using the programmed computer, an ad call for each session in the list of sessions;

receiving, from the ad decision service at the programmed computer, a plurality of advertisements targeted to the list of sessions;

confirming the advertisement placement opportunity comprising binding the source signal stream to the advertisement placement opportunity, wherein binding the source signal stream to the advertisement placement opportunity comprises:

extracting metadata including the channel identifier from the source signal stream;

obtaining a temporal starting location of the advertisement placement opportunity in the source stream based on a wall clock time stamp;

inserting into the source stream a unique signal ID corresponding to the temporal starting location of the advertisement placement opportunity and the channel identifier;

designating the advertisement placement opportunity as a confirmed placement opportunity; and generating a look-ahead decision trigger with the unique signal ID as trigger data; and storing, using the programmed computer, the plurality of advertisements in at least one cache prior to expiration of the time period, wherein the advertisement signal point is detected by the programmed computer.

6. The method of claim 5, wherein, in response to generating a look-ahead decision trigger, performing an ad decision for the confirmed placement opportunity.

7. The method of claim 6, wherein performing an ad decision for the confirmed placement opportunity comprises:

transmitting the look-ahead decision trigger to a Society of Cable and Telecommunications Engineers (SCTE) 130 ad management service; and receiving a plurality ad placement decisions.

8. The method of claim 1, wherein obtaining a plurality of advertisements targeted to the list of sessions comprises:

associating a unique signal ID with each of the plurality of targeted advertisements and storing the plurality of targeted advertisements in the cache.

9. The method of claim 1, wherein storing the plurality of targeted advertisements in the cache comprises transmitting the plurality of targeted advertisements to at least one non-transitory computer readable storage medium associated with a content delivery network.

10. The computer-implemented method of claim 1, wherein the source signal stream comprises content and the advertising placement opportunity.

11. The computer-implemented method of claim 10, wherein content comprises video, audio, or an interactive overlay.

12. The computer-implemented method of claim 1, wherein designated time periods for the advertising placement opportunity corresponds to breaks, pre-rolls, post-rolls, mid-rolls, interstitials, pauses, and video-on-demand requests.

13. A computer system for accelerating advertising placement decisions, comprising:

a memory;

a processing device, coupled to the memory, the processing device to:

receiving, at a programmed computer, a source signal stream having a channel identifier and an indication that an advertisement placement opportunity is located in the signal stream a time period prior to an advertisement signal point;

transmit the channel identifier to a session manager;

receive from the session manager a list of sessions corresponding to a number of recipients currently viewing a channel corresponding to the channel identifier;

transmit the list of sessions and the channel identifier to a subscriber information service;

receive, from the subscriber information service, a list of sets of audience qualifiers correlated to the list of sessions and the channel identifier;

transmit to an ad decision service an ad call for each session in the list of sessions;

receiving, from the ad decision service a plurality of advertisements targeted to the list of sessions; and store the plurality of advertisements in at least one cache prior to expiration of the time period, wherein the advertisement signal point is detected by the programmed computer.

14. A non-transitory computer readable storage medium including instructions that, when executed by a processing system, cause the processing system to perform operations, comprising:

receiving, at a programmed computer, a source signal stream having a channel identifier and an indication that an advertisement placement opportunity is located in the signal stream a time period prior to an advertisement signal point;

transmitting, using the programmed computer, the channel identifier to a session manager;

receiving, from the session manager at the programmed computer, a list of sessions corresponding to a number of recipients currently viewing a channel corresponding to the channel identifier;

transmitting, using the programmed computer, the list of sessions and the channel identifier to a subscriber information service;

receiving, by the programmed computer from the subscriber information service, a list of sets of audience qualifiers correlated to the list of sessions and the channel identifier;

transmitting, to an ad decision service using the programmed computer, an ad call for each session in the list of sessions;

receiving, from the ad decision service at the programmed computer, a plurality of advertisements targeted to the list of sessions; and storing, using the programmed computer, the plurality of advertisements in at least one cache prior to expiration of the time period, wherein the advertisement signal point is detected by the programmed computer.

* * * * *